(12) United States Patent
Fan et al.

(10) Patent No.: US 10,140,244 B2
(45) Date of Patent: Nov. 27, 2018

(54) OPTICAL MODULE AND TRANSMITTING DATA IN OPTICAL MODULE

(71) Applicants: Hisense Broadband Multimedia Technologies Co., Ltd., Qingdao (CN); Hisense Broadband Multimedia Technologies, Ltd., Tortola (VG)

(72) Inventors: Fengmei Fan, Qingdao (CN); Fubin Li, Qingdao (CN)

(73) Assignees: HISENSE BROADBAND MULTIMEDIA TECHNOLOGIES CO., LTD., Qingdao (CN); HISENSE BROADBAND MULTIMEDIA TECHNOLOGIES, LTD., Tortola (VG)

(*) Notice: Subject to any disclaimer, the term of this patent is extended or adjusted under 35 U.S.C. 154(b) by 87 days.

(21) Appl. No.: 15/391,504

(22) Filed: Dec. 27, 2016

(65) Prior Publication Data
US 2017/0337153 A1  Nov. 23, 2017

(30) Foreign Application Priority Data
May 20, 2016  (CN) .......................... 2016 1 0344757

(51) Int. Cl.
G06F 13/40    (2006.01)
G06F 13/42    (2006.01)

(52) U.S. Cl.
CPC ...... G06F 13/4291 (2013.01); G06F 13/4072 (2013.01)

(58) Field of Classification Search
CPC .................. G06F 13/4291; G06F 13/4072
See application file for complete search history.

(56) References Cited

U.S. PATENT DOCUMENTS 8,667,204 B2 * 3/2014 Fischer ............... G06F 13/4291
                                              710/110
2006/0239690 A1 * 10/2006 Dybsetter ........... G06F 13/4291
                                              398/135

(Continued)

FOREIGN PATENT DOCUMENTS

CN    105373511 A    3/1916
CN    102723995 A    10/2012

OTHER PUBLICATIONS

European Search Report mailed in corresponding European Patent Application No. 17152413.5 dated Jul. 31, 2017, (16p).

(Continued)

Primary Examiner — Farley Abad
(74) Attorney, Agent, or Firm — Brinks Gilson & Lione

(57) ABSTRACT

An optical module and a method of transmitting data in the optical module are provided in the present disclosure. According to an example, the optical module may comprise a micro controller unit (MCU) and N number of first driving chips having a same chip address. The MCU may be configured with a serial data (SDA) bus interface and N number of first serial clock (SCL) bus interfaces. Each of the N number of first driving chips may be configured with a SDA bus interface which is configured to be connected with the SDA bus interface on the MCU and a SCL bus interface which is configured to be connected with one of the N number of first SCL bus interfaces on the MCU.

15 Claims, 4 Drawing Sheets

(56) References Cited

U.S. PATENT DOCUMENTS

2008/0288684 A1* 11/2008 Ellison ................ G06F 13/4295
                                                    710/106
2010/0199006 A1*  8/2010 Takeuchi ............ G06F 13/4291
                                                    710/107
2012/0191889 A1   7/2012 Fischer

OTHER PUBLICATIONS

State Intellectual Property Office of the People's Republic of China, Office Action and Search Report Issued in Application No. 201610344757.1, dated Jul. 4, 2018, 7 pages, and an English translation of the Office Action.

* cited by examiner

OPTICAL MODULE AND TRANSMITTING DATA IN OPTICAL MODULE

CROSS-REFERENCE TO RELATED APPLICATIONS

The application claims priority to Chinese Patent Application No. 201610344757.1, filed on May 20, 2016, the entire contents of which are hereby incorporated by reference for all purposes.

TECHNICAL FIELD

The present disclosure relates to an optical module and a method of transmitting data in the optical module in a technical field of optical communication.

BACKGROUND

In the field of optical communication, an optical module may comprise a plurality of lasers which function as an optical transmitting assembly. Each of the lasers may be driven by a corresponding driving chip. A micro controller unit (MCU) in the optical module may control a plurality of driving chips via an inter-integrated circuit (I2C) bus, and thereby control the plurality of lasers. The I2C bus may comprise a serial clock (SCL) bus and a serial data (SDA) bus. The SCL bus may be configured to transmit a periodic clock signal, and the SDA bus may be configured to transmit a data signal according to a cycle of the clock signal. The MCU may be connected with the plurality of driving chips via the I2C bus. When the plurality of driving chips have chip addresses different from each other, the MCU may identify each of the driving chips according to its chip address, and thereby control each of the driving chips.

If the MCU is connected with a plurality of driving chips having a same chip address, an address decoder may be further required for the optical module. When one of the driving chips having the same chip address is to be controlled, the MCU may identify the driving chip to be controlled from the same chip address by the address decoder.

SUMMARY

In order to solve complex structure of an optical module, the present disclosure provides an optical module and a method of transmitting data in the optical module. The technical solutions may be as follows.

In one aspect, an optical module is provided in the present disclosure. The optical module may comprise:

a micro controller unit (MCU) configured with a serial data (SDA) bus interface and N number of first serial clock (SCL) bus interfaces, wherein N may be an integer greater than or equal to 2; and N number of first driving chips having a same chip address, each of the N number of first driving chips may be configured with a SDA bus interface which is configured to be connected with the SDA bus interface on the MCU; and a SCL bus interface which is configured to be connected with one of the N number of first SCL bus interfaces on the MCU.

In another aspect, a method of transmitting data in the optical module is provided in the present disclosure, the method may comprise:

transmitting, by the MCU, a clock signal to a target first driving chip via a target first SCL bus interface on the MCU, where the target first driving chip may be one of the N number of first driving chips, and the target first SCL bus interface may be connected with a SCL bus interface of the target first driving chip;

transmitting, by the MCU, a data signal to the N number of first driving chips via the SDA bus interface on the MCU;

transmitting, by the target first driving chip, a response message to the MCU in response to receiving the clock signal and the data signal; and communicating, by the MCU, with the target first driving chip according to the response message.

BRIEF DESCRIPTION OF DRAWINGS

The details of one or more embodiments of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

Figure 1:
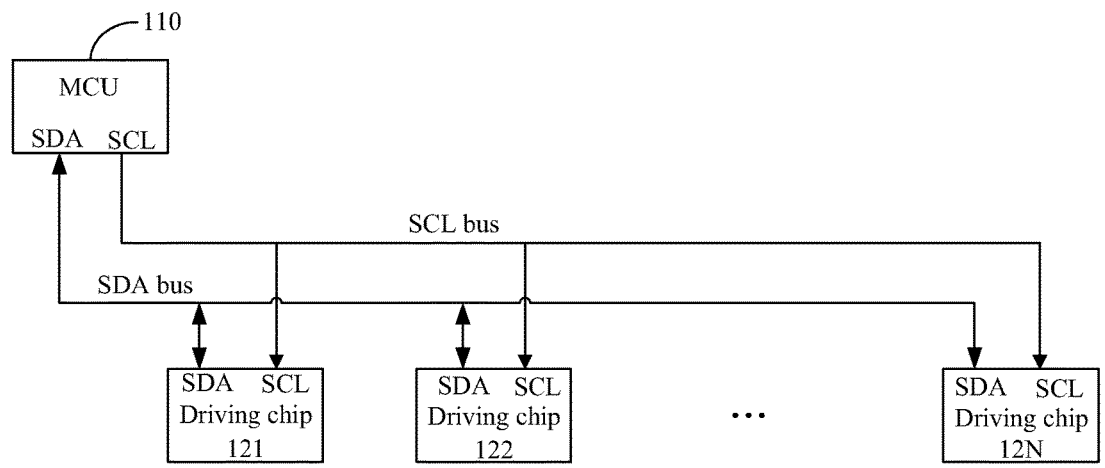
FIG. 1 is a structural schematic diagram of an optical module.
Figure 2:
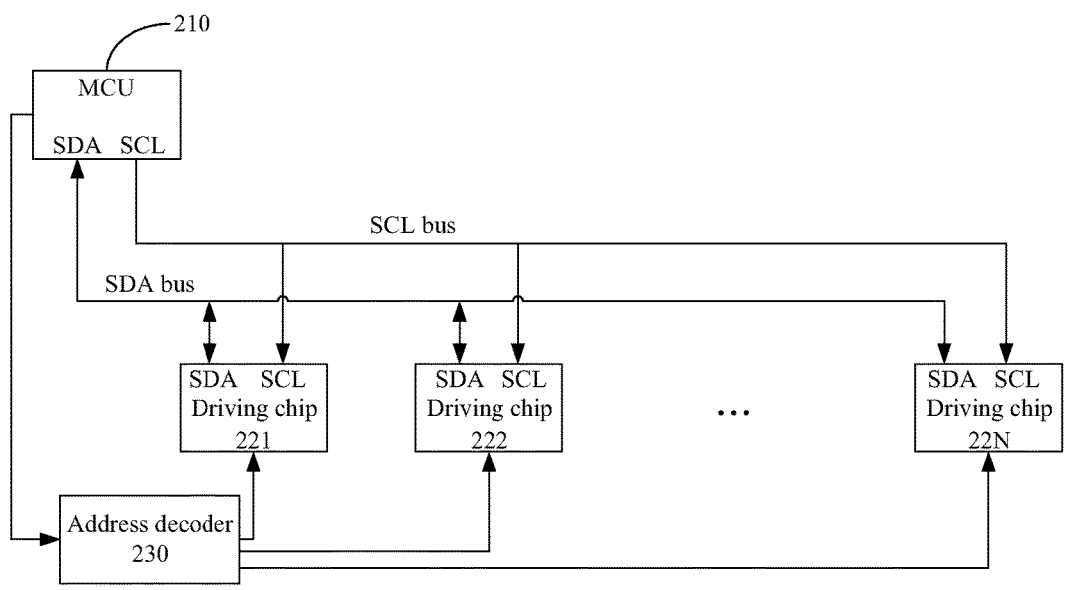
FIG. 2 is a structural schematic diagram of another optical module.

As shown in FIG. 1 and FIG. 2, an I2C bus may be consisted of a SCL bus and a SDA bus. FIG. 1 is a structural schematic diagram of an optical module. As shown in FIG. 1, a MCU 110 may be configured to connect with a plurality of driving chips 121-12N via the I2C bus. The plurality of driving chips 121-12N may have chip addresses different from each other. The MCU 110 may identify a driving chip according to its chip address, and then control the driving chip accordingly.

FIG. 2 is a structural schematic diagram of another optical module. As shown in FIG. 2, a MCU 210 may be configured to connect with a plurality of driving chips 221-22N having a same chip address, and the optical module may be further provided with an address decoder 230. The MCU 210 may identify any one of the plurality of driving chips 221-22N via the address decoder 230 and then control the identified driving chip accordingly.

Figure 3:
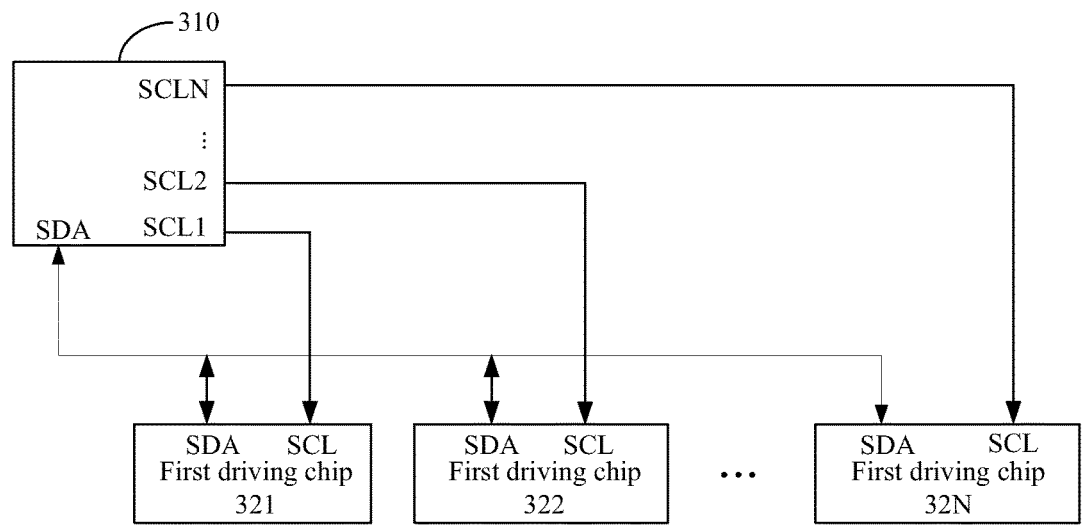
FIG. 3 is a structural schematic diagram of an optical module according to an example of the present disclosure.

FIG. 3 is a structural schematic diagram of an optical module according to an example of the present disclosure. As shown in FIG. 3, the optical module may comprise a MCU 310 and N number of first driving chips 321-32N. The N number of first driving chips 321-32N may have a same chip address, and N may be an integer greater than or equal to 2.

The MCU 310 may be configured with a serial data (SDA) bus interface and N number of first serial clock (SCL) bus interfaces, while each of the N number of first driving chips 321-32N may be configured with a SDA bus interface and a SCL bus interface. Where, the SDA bus interface on the MCU 310 may be connected with the SDA bus interfaces on the first driving chips 321-32N, and each of the N number of first SCL bus interfaces on the MCU 310 may be connected with the SCL bus interface on one and only one of the first driving chips 321-32N.

In summary, in the optical module in accordance with an example of the present disclosure, the MCU 310 may be configured with N number of first SCL bus interfaces, and each of the N number of first SCL bus interfaces may connect with one and only one of the N number of first driving chips 321-32N via a SCL bus. When communication with a target first driving chip, e.g., the first driving chip 321, in the N number of first driving chips is required, the MCU 310 may transmit a clock signal to the target first driving chip 321 via a first SCL bus interface connecting with the target first driving chip 321 (hereinafter, may also referred to as "target first SCL bus interface" and transmit a data signal to all the N number of first driving chips 321-32N via the SDA bus interface on the MCU 310. Then, upon receiving the data signal and the clock signal, the target first driving chip 321 may transmit a response message to the MCU 310 and thereby start communication with the MCU 310. It may be noted that the data signal and the clock signal may be received by the first driving chip 321 simultaneously, or the clock signal may be received firstly and then the data signal may be received by the first driving chip 321 within duration of the clock signal. The optical module provided by the present disclosure may have a simple structure, and communication between the MCU 310 and a plurality of driving chips having a same chip address may be realized without an auxiliary device.

In an example in accordance with the present disclosure, the MCU 310 in the optical module may transmit a clock signal to the target first driving chip via the target first SCL bus interface, and transmit a data signal to all the N number of first driving chips 321-32N comprising the target first driving chip via the SDA bus interface. The target first SCL bus interface on the MCU may be connected with a SCL bus interface of the target first driving chip.

One of the first driving chips 321-32N, e.g., the target first driving chip 322, in the optical module may receive the data signal and the clock signal transmitted by the MCU 310. And the target first driving chip, upon receiving the data signal and the clock signal transmitted by the MCU 310, may transmit a response message to the MCU 310 via the SDA bus interface on the first driving chip 322.

Figure 4:
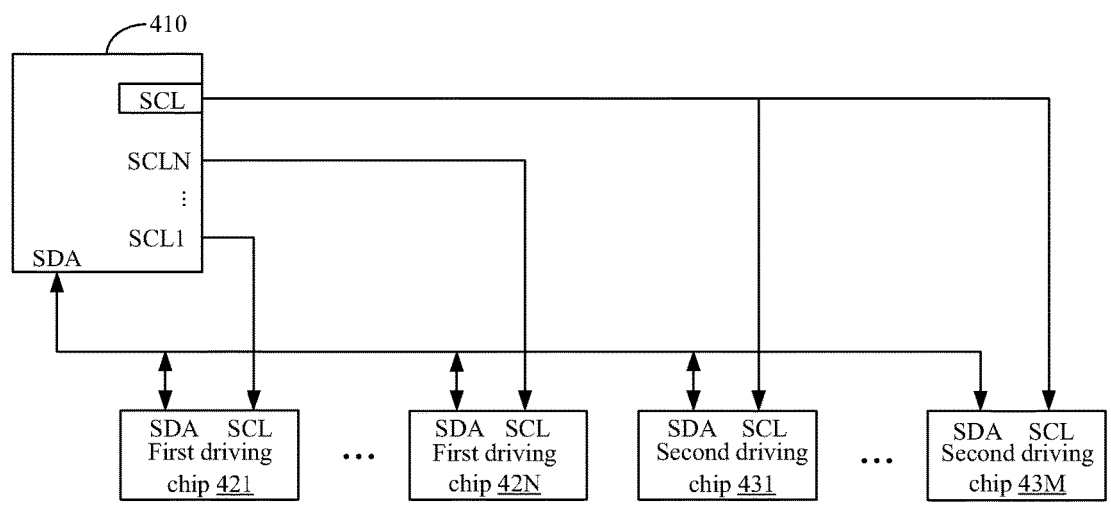
FIG. 4 is a structural schematic diagram of an optical module according to another example of the present disclosure.

FIG. 4 is a structural schematic diagram of an optical module according to another example of the present disclosure. On the basis of FIG. 3, as shown in FIG. 4, the optical module may further comprise M number of second driving chips. In other words, the optical module may comprise a MCU 410, N number of first driving chips 421-42N and M number of second driving chips 431-43M. The N number of first driving chips 421-42N may have a same chip address, and N may be an integer greater than or equal to 2. The M number of second driving chips 431-43M may have chip addresses different from each other and different from the chip address of the N number of first driving chips 421-42N, M may be an integer greater than or equal to 1.

With reference to FIG. 4, a second SCL (SSCL) bus interface may be further configured on the MCU 410 besides a SDA bus interface and N number of first SCL bus interfaces. A SDA bus interface and a SCL bus interface may be configured on each of the first driving chips 421-42N and each of the second driving chips 431-43M. The N number of first SCL bus interfaces on the MCU 410 may be connected with the SCL bus interface on one and only one of the first driving chips 421-42N. The second SCL (SSCL) bus interface may be configured to connect with the SCL bus interface on each of the second driving chips 431-43M. The SDA bus interface on the MCU 410 may be configured to connect with the SDA bus interface on each of the first driving chips 421-42N and each of the second driving chips 431-43M.

In an example in accordance with the present disclosure, the MCU 410 may be configured to store chip addresses of the first driving chips 421-42N and the second driving chips 431-43M. Since the second driving chips 431-43M have chip addresses different from each other, the MCU 410 may identify any one of the second driving chips 431-43M according to its chip address. With respect to the first driving chips 421-42N having the same chip address, the MCU 410 may be configured to identify any one of the first driving chips 421-42N according to an identifier (e.g., a serial number of pin) of a first SCL bus interface on the MCU 410 connected with the first driving chip.

For example, as shown in FIG. 4, the MCU 410 may determine that a driving chip connected with the first SCL bus interface SCL1 is the first driving chip 421 and a driving chip connected with the first SCL bus interface SCLN is the first driving chip 42N. When communication with a target first driving chip 421 is required, the MCU 410 may transmit a clock signal to the target first driving chip 421 via the first SCL bus interface SCL1, and transmit a data signal to all the driving chips 421-42N and 431-43M via the SDA bus interface on the MCU 410. Only the first driving chip 421 may receive the clock signal as well as the data signal, so the first driving chip 421 may transmit a response message to the MCU 410, such that the MCU 410 may transmit data to the first driving chip 421.

For example, with reference to FIG. 4, when communication with a target second driving chip 431 in the M number of second driving chips is required, the MCU 410 may transmit a clock signal to the M number of second driving chips 431-43M via the second SCL (SSCL) bus interface, and transmit a data signal to the first driving chips 421-42N and second driving chips 431-43M via the SDA bus interface on the MCU 410. The data signal may comprise a target chip address and a read/write control signal. The read/write control signal may be a read control signal and/or a write control signal.

The first driving chips 421-42N only receive the data signal, but do not receive the clock signal. Therefore, it may be determined that the first driving chips 421-42N are not the communication object for the MCU 410. Since the second driving chips 431-43M have chip addresses different from each other, after receiving the clock signal and the data signal, each of the second driving chips 431-43M may compare its own chip address with the target chip address comprised in the data signal, so as to find whose chip address is the same as the target chip address in the data signal. For example, the chip address of the second driving chip 431 is the same as the target chip address comprised in the data signal. The second driving chip 431 may transmit a response message to the MCU 410. Therefore, the communication between the MCU 410 and the second driving chips 431-43M having different chip addresses may be realized in the present disclosure.

Figure 5:
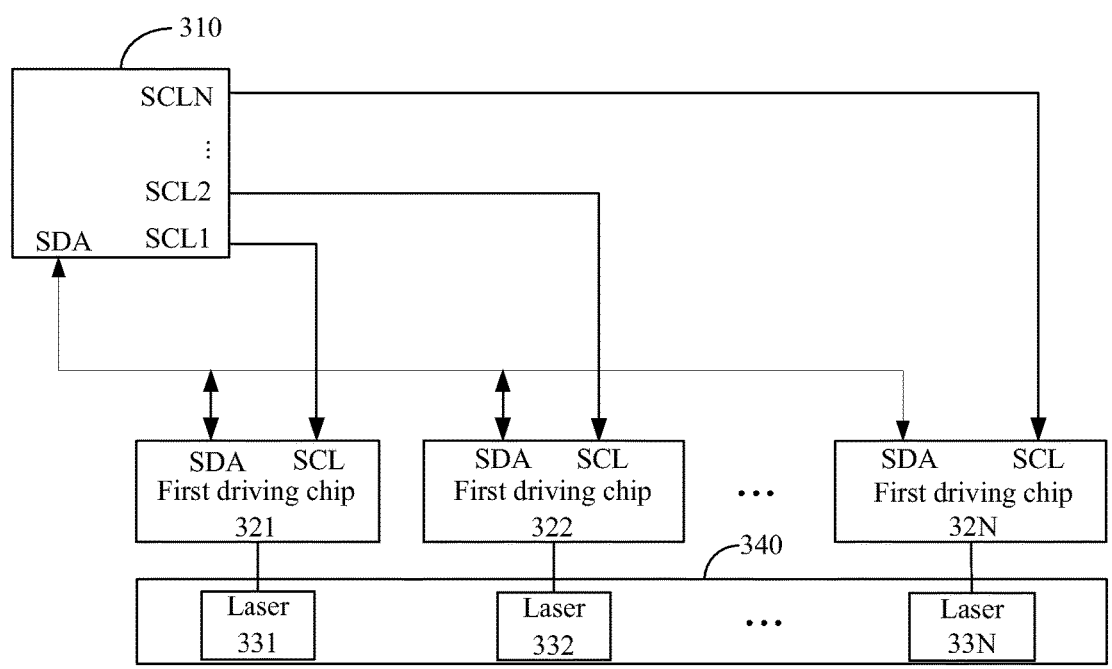
FIG. 5 is a structural schematic diagram of an optical module according to still another example of the present disclosure.

FIG. 5 is a structural schematic diagram of an optical module according to still another example of the present disclosure. As shown in FIG. 5, on the basis of FIG. 3, the optical module may further comprise at least one laser connected with a first driving chip. For example, the optical module as shown in FIG. 5 comprises N number of lasers 331-33N. Each of the first driving chips 321-32N may be connected with one of the lasers 331-33N. A laser may be driven by a first driving chip connected with the laser. For example, the laser 331 may be driven by the first driving chip 321 to turn on or turn off, or driving current for driving the laser 331 may also be controlled by the first driving chip 321.

In summary, in an optical module in accordance with an example of the present disclosure, a MCU may be configured with N number of first SCL bus interfaces, and each of the N number of first SCL bus interfaces may connect with the SCL bus interface on one and only one of N number of first driving chips having a same chip address via a SCL bus. When communication with a target first driving chip in the N number of first driving chips is required, the MCU may transmit a clock signal to the target first driving chip via a first SCL bus interface connected with the target first driving chip, and transmit a data signal to all the first driving chips via the SDA bus interface. Upon receiving the data signal and the clock signal, the target first driving chip may transmit a response message to the MCU and thereby start a communication with the MCU. The optical module provided by in an example of the present disclosure has a simple structure, and a communication between the MCU and a plurality of driving chips having a same chip address may be realized without an auxiliary device. Furthermore, the influence of an auxiliary device on the communication accuracy between devices may be avoided, thereby effectively improving data transmission reliability between the MCU and the plurality of driving chips.

Figure 6:
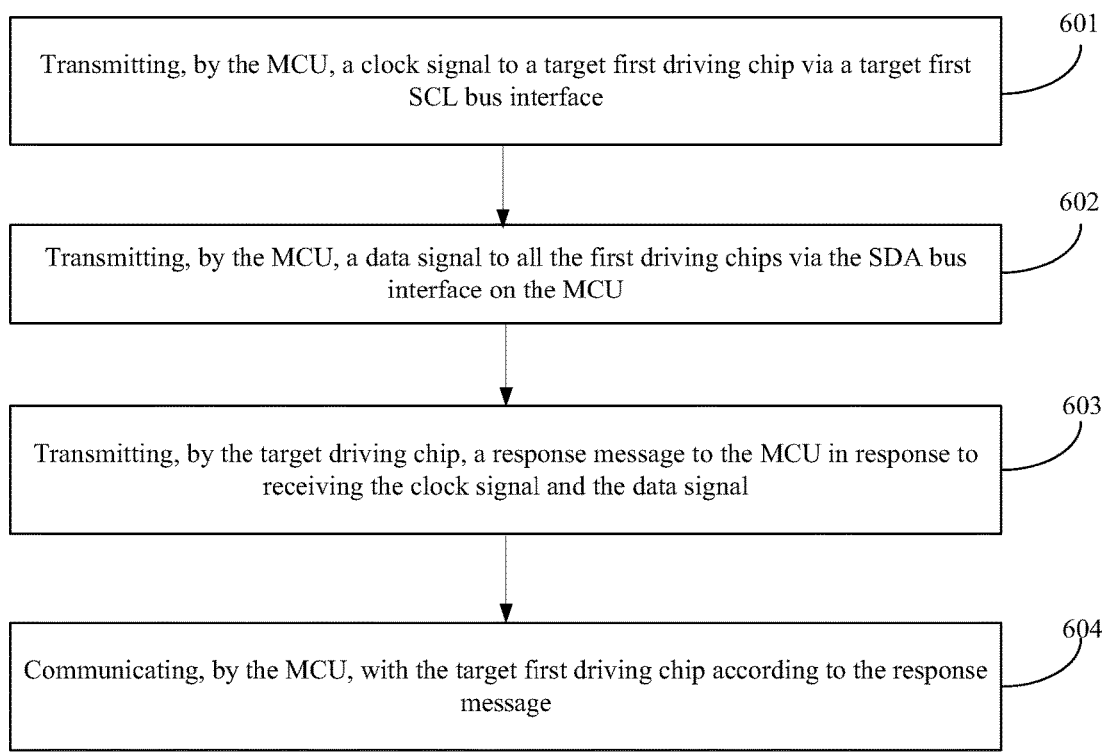
FIG. 6 is a flow chart of a method of transmitting data in an optical module according to an example of the present disclosure.

FIG. 6 is a flow chart of a method of transmitting data in an optical module provided by an example of the present disclosure. The method may be used in a MCU as shown in any one of FIG. 3-5, and the method may be introduced hereafter by taking FIG. 3 as an example. With reference to FIG. 6, the method may comprise blocks 601-604.

At block 601, a clock signal may be transmitted by the MCU 310 to a target first driving chip via a target first SCL bus interface, where the target first SCL bus interface may be connected with the SCL bus interface of the target first driving chip, and the target first driving chip may be one of the N number of first driving chips.

At block 602, a data signal may be transmitted by the MCU 310 to all the first driving chips via the SDA bus interface on the MCU.

At block 603, a response message may be transmitted by the target first driving chip to the MCU 310 in response to receiving the clock signal and the data signal.

At block 604, the MCU 310 may communicate with the target first driving chip according to the response message.

In an example in accordance with the present disclosure, whether the response message transmitted by the target first driving chip is received in a preset time period from the transmission of the data signal may be determined by the MCU 310. If the preset time period is past but none response message is received from the target first driving chip, then the clock signal may be retransmitted by the MCU 310 to the target first driving chip via the target first SCL bus interface and the data signal may be retransmitted by the MCU 310 to the N number of first driving chips via the SDA bus interface on the MCU 310.

In an example in accordance with the present disclosure, according to FIG. 4, when communication with a target second driving chip, e.g., the second driving chip 431, in the M number of second driving chips is required, the MCU 410 may transmit a clock signal to the M number of second driving chips 431-43M via the second SCL (SSCL) bus interface, and transmit a data signal to the first driving chips 421-42N and the second driving chips 431-43M via the SDA bus interface on the MCU 410. The second driving chips 431-43M have chip addresses different from each other. Therefore, upon receiving the clock signal and the data signal, each of the second driving chips 431-43M may compare its own chip address with a target chip address comprised in the data signal. If the chip address of the second driving chip 431 is the same as the target chip address comprised in the data signal, then the second driving chip 431 may transmit a response message to the MCU 410. Therefore, a communication between the MCU 410 and the second driving chips 431-43M having different chip addresses may be realized in the present disclosure.

In summary, a method of transmitting data in an optical module may be provided in the present disclosure. When communication with a target first driving chip, e.g., the first driving chip 321, in the N number of first driving chips is required, the MCU 310 may transmit a clock signal to the first driving chip 321 to be communicated via the first SCL bus interface SCL1, and transmit a data signal to all the first driving chips 321-32N via the SDA bus interface on the MCU 310. Then, upon receiving the data signal and the clock signal, the first driving chip 321 may transmit a response message to the MCU 310, and communicate with the MCU 310. When the MCU 310 communicates with the first driving chips 321-32N having the same chip address with the above method, the first driving chips 321-32N may be identified without an auxiliary device, thereby the influence of the auxiliary device on the communication accuracy between devices may be avoided, and the data transmission reliability between the MCU 310 and the first driving chips 321-32N may be effectively improved.

It may be noted that in practical application, the block 601 and the block 602 may be executed simultaneously. For example, the MCU 310 may transmit the clock signal and the data signal at a same time. The execution sequence of the block 601 and the block 602 is not defined in examples of the present disclosure.

In an example in accordance with the present disclosure, after the MCU 310 transmits the clock signal to the target first driving chip via the target SCL bus interface and transmits the data signal to all the first driving chips 321-32N comprising the target first driving chip via the SDA bus interface on the MCU 310, the MCU 310 may further determine whether the response message transmitted by the target first driving chip is received within the preset time period from the transmission of data signal.

If the preset time period is past but none response message is received from the target first driving chip, the MCU 310 may retransmit the clock signal to the target first driving chip via the target SCL bus interface, and retransmit the data signal to all of the first driving chips 321-32N comprising the target first driving chip via the SDA bus interface on the MCU 310.

In an example in accordance with the present disclosure, the preset time period may be nine cycle of the clock signal. For example, as shown in FIG. 3, assuming that the SDA bus on the MCU 310 is at a high level in an initial state. When communication with the first driving chip 321 is required, the MCU 310 may transmit a clock signal to the first driving chip 321 via the SCL bus interface SCL1, and transmit a start signal to the first driving chip via the SDA bus interface on the MCU 310. The start signal may enable the SDA bus on the MCU 310 to switch from the high level to a low level. Afterwards, the MCU 310 may transmit a data signal comprising a read/write control signal and the chip address of the target first driving chip 321 to the N number of first driving chips 321-32N one by one via the SDA bus interface. According to the I2C protocol, the chip address of the first driving chip 321 may be seven bits, and the read/write control signal may be one bit. Therefore, the MCU 310 may transmit a total eight bits of data signal to the N number of first driving chips 321-32N via the SDA bus interface thereof. Eight cycles of the clock signal may be required for the transmission of the data signal. A response message may be transmitted to the MCU 310 in a ninth cycle of the clock signal when the first driving chip 321 receives the clock signal and the data signal. For example, the level of the SDA bus on the MCU 310 may be lowered, indicating that the first driving chip 321 has received the eight-bit data signal. If the level of the SDA bus on the MCU 310 is still at the high level in the ninth cycle of the clock signal, it may be determined that the MCU 310 may not receive the response message transmitted by the first driving chip 321, and the MCU 310 may retransmit the clock signal and the data signal.

A method of transmitting data in an optical module is provided in the present disclosure. When communication with a target first driving chip, e.g., the first driving chip 321, in the N number of first driving chips having the same chip address is required, a clock signal may be transmitted by the MCU 310 to the first driving chip 321 via a first SCL bus interface SCL1, and a data signal may be transmitted by the MCU 310 to all the first driving chips 321-32N via the SDA bus interface thereof. Upon receiving the data signal and the clock signal, the first driving chip 321 may transmit a response message to the MCU 310. Then the first driving chip 321 may communicate with the MCU 310. When the MCU 310 communicates with the first driving chips 321-32N having the same chip address with the above method, the first driving chips 321-32N may be identified without an auxiliary device, thereby the influence of the auxiliary device on the communication between devices may be avoided and the data transmission reliability between the MCU 310 and the first driving chips 321-32N may be effectively improved.

The figures are only illustrations of an example, where the procedure shown in the figures may be not necessarily essential for implementing the present disclosure. Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An optical module, comprising:
    a micro controller unit (MCU) configured with a serial data (SDA) bus interface and N number of first serial clock (SCL) bus interfaces, wherein N is an integer greater than or equal to 2;
    N number of first driving chips having a same chip address, each of the N number of first driving chips is configured with:
        a SDA bus interface which is configured to be connected with the SDA bus interface on the MCU; and
        a SCL bus interface which is configured to be connected with one of the N number of first SCL bus interfaces on the MCU;
    wherein the MCU is configured to identify any one of the first driving chips according to an identifier of a first SCL bus interface on the MCU connected with the first driving chip; and
    wherein the identifier is a serial number of a pin for the first SCL bus interface.

2. The optical module according to claim 1, wherein the MCU is configured to store chip addresses of the N first driving chips.

3. The optical module according to claim 1, wherein
    the optical module further comprises M number of second driving chips having chip addresses different from each other and different from the chip address of the N number of first driving chips, M is an integer greater than or equal to 1;
    each of the M number of second driving chips is configured with
        a SDA bus interface which is configured to be connected with the SDA bus interface on the MCU, and
        a SCL bus interface which is configured to be connected with a second SCL bus interface further provided on the MCU.

4. The optical module according to claim 3, wherein the MCU is further configured to store a chip address of each of the M number of second driving chips.

5. The optical module according to claim 3, wherein the MCU is further configured to identify any one of the second driving chips according to chip address of the second driving chip.

6. The optical module according to claim 1, wherein at least one of the N number of first driving chips is configured to be connected with a laser.

7. The optical module according to claim 3, wherein at least one of the M number of second driving chips is configured to be connected with a laser.

8. A method of transmitting data in an optical module, wherein
    the optical module comprises:
        a micro controller unit (MCU) configured with a serial data (SDA) bus interface and N number of first serial clock (SCL) bus interfaces, wherein N is an integer greater than or equal to 2; and
        N number of first driving chips having a same chip address, each of the N number of first driving chips is configured with
            a SDA bus interface which is configured to be connected with the SDA bus interface on the MCU, and
            a SCL bus interface which is configured to be connected with one of the N number of first SCL bus interfaces on the MCU;

the method comprises:
    transmitting, by the MCU, a clock signal to a target first driving chip via a target first SCL bus interface on the MCU, wherein the target first driving chip is one of the N number of first driving chips, and the target first SCL bus interface is connected with a SCL bus interface of the target first driving chip;
    transmitting, by the MCU, a data signal to the N number of first driving chips via the SDA bus interface on the MCU;
    determining, by the MCU, whether a response message transmitted by the target first driving chip is received within a preset time period from the transmission of the data signal; wherein the target first driving chip transmits the response message to the MCU in response to receiving the clock signal and the data signal;
    retransmitting, by the MCU, the clock signal to the target first driving chip via the target first SCL bus interface and the data signal to the N number of first driving chips via the SDA bus interface on the MCU if the preset time period is past but no response message is received from the target first driving chip; and
    communicating, by the MCU, with the target first driving chip when the MCU receives the response message with the preset time period.

9. The method according to claim 8, wherein receiving the clock signal and data signal comprises any one of:
    simultaneously receiving the data signal and the clock signal by the target first driving chip;
    firstly receiving the clock signal and then receiving the data signal within a duration of the clock signal by the target first driving chip.

10. The method according to claim 8, wherein the preset time period is nine cycles of the clock signal.

11. The method according to claim 8, wherein
the optical module further comprises M number of second driving chips having chip addresses different from each other and different from the chip address of the N number of first driving chips, M is an integer greater than or equal to 1, each of the M number of second driving chips is configured with
    a SDA bus interface which is configured to be connected with the SDA bus interface on the MCU, and
    a SCL bus interface which is configured to be connected with a second SCL bus interface further provided on the MCU;

the method further comprises:
    transmitting, by the MCU, a clock signal to the M number of second driving chips via the second SCL bus interface;
    transmitting, by the MCU, a data signal to the N number of first driving chips and the M number of second driving chips via the SDA bus interface on the MCU;
    transmitting, by a target second driving chip, a response message to the MCU in response to receiving the clock signal and the data signal, wherein the target second driving chip is one of the M number of second driving chips of which a chip address is the same as a target chip address comprised in the data signal; and
    communicating, by the MCU, with the target second driving chip according to the response message.

12. The method according to claim 11, wherein the data signal comprises the target chip address and a read/write control signal.

13. The method according to claim 12, wherein the read/write control signal comprises any one or more of:
    a read control signal;
    a write control signal.

14. The method according to claim 11, wherein transmitting a response message to the MCU in response to receiving the clock signal and the data signal comprises:
    comparing, by each of the second driving chips, a chip address of the second driving chip with the target chip address comprised in the data signal upon receiving the clock signal and the data signal; and
    transmitting, by the target second driving chip, a response message to the MCU upon determining the chip address of itself is the same as the target chip address comprised in the data signal.

15. The method according to claim 11, wherein the method further comprises:
    determining, by the MCU, whether a response message transmitted by the target second driving chip is received within a preset time period from the transmission of the data signal, wherein the preset time period is nine cycles of the clock signal; and
    retransmitting, by the MCU, the clock signal to the M number of second driving chips via the second SCL bus interface and the data signal to the N number of first driving chips and the M number of second driving chips via the SDA bus interface on the MCU if the preset time period is past but none response message is received from the target second driving chip.

* * * * *